United States Patent
Lin et al.

(10) Patent No.: US 11,435,817 B2
(45) Date of Patent: Sep. 6, 2022

(54) MULTI-POWER MANAGEMENT SYSTEM AND OPERATION METHOD THEREOF

(71) Applicants: Chin-Hsiang Lin, Taipei (TW); Chien-Lee Liu, Taipei (TW); Tzu-Chiang Mi, Taipei (TW); Yi-Hsun Lin, Taipei (TW)

(72) Inventors: Chin-Hsiang Lin, Taipei (TW); Chien-Lee Liu, Taipei (TW); Tzu-Chiang Mi, Taipei (TW); Yi-Hsun Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/231,021

(22) Filed: Apr. 15, 2021

(65) Prior Publication Data

US 2021/0325959 A1   Oct. 21, 2021

Related U.S. Application Data

(60) Provisional application No. 63/011,316, filed on Apr. 17, 2020.

(51) Int. Cl.
*G06F 1/00* (2006.01)
*G06F 1/3296* (2019.01)
(Continued)

(52) U.S. Cl.
CPC ............ *G06F 1/3296* (2013.01); *G06F 1/263* (2013.01); *G06F 1/3206* (2013.01)

(58) Field of Classification Search
CPC ............................... G06F 1/3296; G06F 1/263
See application file for complete search history.

(56) References Cited

U.S. PATENT DOCUMENTS 10,073,509 B2 * 9/2018 Lin ..................... G06F 1/263
10,305,308 B2 * 5/2019 Tsai ..................... H02J 7/007
(Continued)

FOREIGN PATENT DOCUMENTS

CN          106911254         6/2017
GB          2463339 A  *     3/2010   ............. H02M 1/32
(Continued)

OTHER PUBLICATIONS

"Office Action of Taiwan Counterpart Application", dated Dec. 2, 2021, p. 1-p. 6.

*Primary Examiner* — Mohammed H Rehman
(74) *Attorney, Agent, or Firm* — JCIPRNET

(57) ABSTRACT

A multi-power management system and an operation method for the multi-power management system are provided. The multi-power management system includes multiple adapters and a power supply circuit. The adapters respectively provide multiple powers. The power supply circuit receives multiple input power values of the adapters, and calculates multiple input power value contribution ratios of the adapters according to the input power values. The power supply circuit further provides a control signal according to a sum of the output current values of multiple output current values of the powers and the input power value contribution ratios. The adapters adjust the output current values and multiple output voltage values respectively in response to the control signal.

21 Claims, 6 Drawing Sheets

(51) Int. Cl.
*G06F 1/3206* (2019.01)
*G06F 1/26* (2006.01)

(56) References Cited

U.S. PATENT DOCUMENTS

| | | | |
|---|---|---|---|
| 10,928,844 B2* | 2/2021 | Chuang | G05F 1/575 |
| 2009/0307690 A1* | 12/2009 | Logan | G06F 11/0793 |
| | | | 718/1 |
| 2017/0170734 A1* | 6/2017 | Sheng | H02M 3/33576 |
| 2018/0013303 A1* | 1/2018 | Wu | H02J 7/007 |

FOREIGN PATENT DOCUMENTS

| | | |
|---|---|---|
| TW | I324427 | 5/2010 |
| TW | 202015305 | 4/2020 |

\* cited by examiner

MULTI-POWER MANAGEMENT SYSTEM AND OPERATION METHOD THEREOF

CROSS-REFERENCE TO RELATED APPLICATION

This application claims the priority benefit of U.S. provisional application Ser. No. 63/011,316, filed on Apr. 17, 2020. The entirety of the above-mentioned patent application is hereby incorporated by reference herein and made a part of this specification.

BACKGROUND

Technical Field

The disclosure relates to a power management system and an operation method for the power management system, and more particularly, to a multi-power management system and an operation method for the multi-power management system.

Description of Related Art

Generally speaking, electronic devices with high power requirements (such as gaming notebooks) adopt a power supply mechanism that can be applied to high-power power adapters. However, the architecture applied to the high-power power adapter is more complicated. In addition, the electronic devices with high power requirements have applications with low power requirements. In the case of meeting multiple power requirements, the design of the power supply mechanism for a single power adapter may be quite difficult.

SUMMARY

The disclosure relates to a multi-power management system and an operation method for the multi-power management system, which may provide greater power and achieve a power supply balance of multiple powers.

A multi-power management system according to the disclosure includes multiple adapters and a power supply circuit. The adapters respectively provide multiple powers. The power supply circuit is coupled to the adapters. The power supply circuit communicates with the adapters to receive multiple input power values of the adapters, and calculates multiple input power value contribution ratios of the adapters according to the input power values. The power supply circuit further provides a control signal according to a sum of the output current values of multiple output current values of the powers and the input power value contribution ratios. The adapters adjust the output current values and multiple output voltage values of the adapters respectively in response to the control signal.

An operation method for the multi-power management system according to the disclosure is provided. The multi-power management system includes the adapters and the power supply circuit. The operation method includes the following steps. The powers are provided by the adapters. The input power values of the adapters are received by a communication between the power supply circuit and the adapters. The input power value contribution ratios of the adapters are calculated by the power supply circuit according to the input power values. A corresponding control signal is provided by the power supply circuit according to the sum of the output current values of the output current values of the powers and the input power value contribution ratios. The output current values and the output voltage values of the adapters are adjusted by the adapters respectively in response to the control signal.

Based on the above, the multi-power management system according to the disclosure includes the adapters and the power supply circuit. The power supply circuit calculates the input power value contribution ratios of the adapters according to the input power values, and provides the corresponding control signal according to the sum of the output current values and the input power value contribution ratios. The adapters adjust the output current values and the output voltage values of the adapters respectively in response to the control signal. In this way, the multi-power management system may provide greater power and achieve the power supply balance between the adapters.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
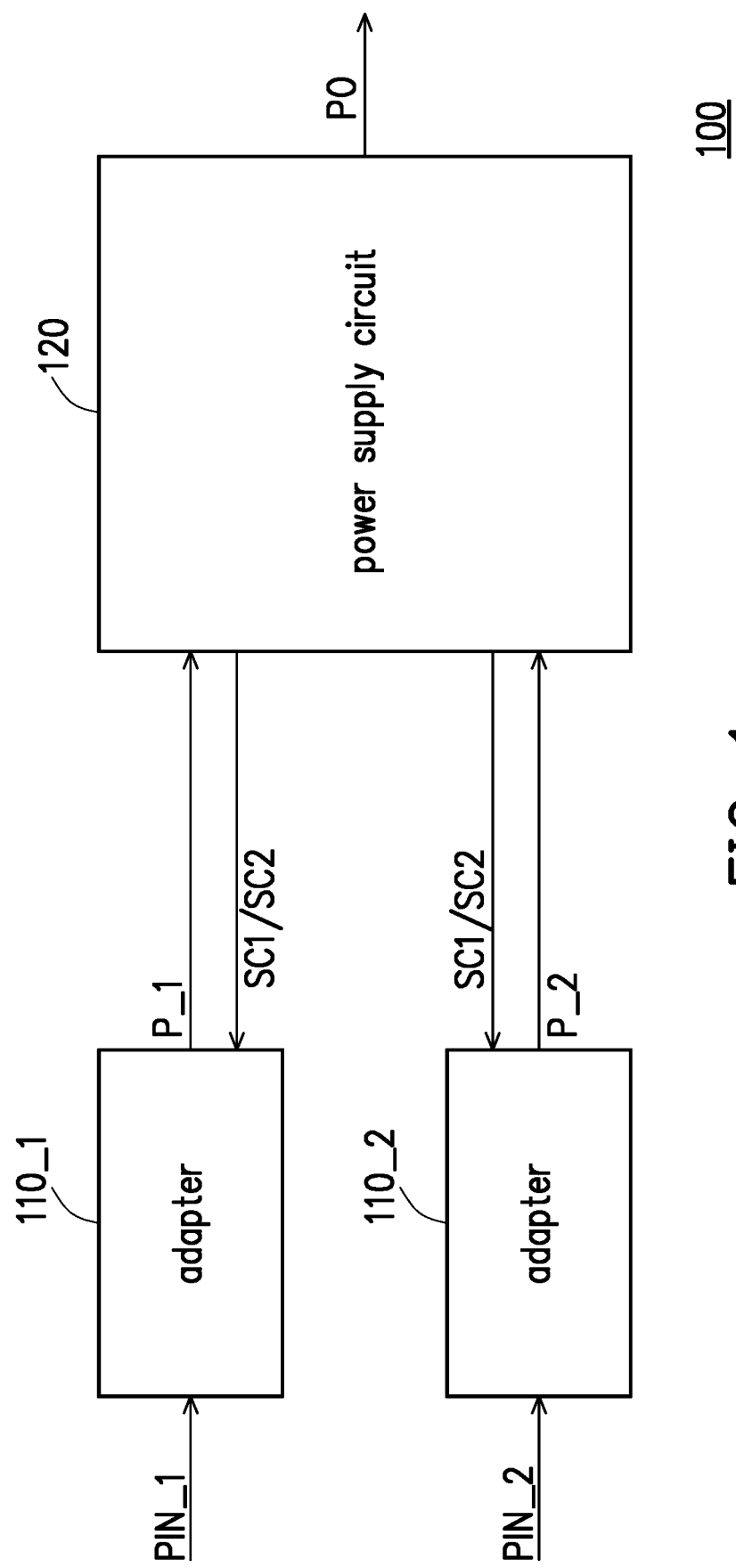
FIG. 1 is a schematic view of a multi-power management system according to the first embodiment of the disclosure.

Some embodiments of the disclosure will be described in detail with the accompanying drawings. Wherever possible, the same reference numbers are used in the drawings and the description to refer to the same or like parts. The embodiments are only a part of the disclosure, and the disclosure does not disclose all of the implementations. More precisely, the embodiments are just examples within the scope of the patent application of the disclosure.

Figure 2:
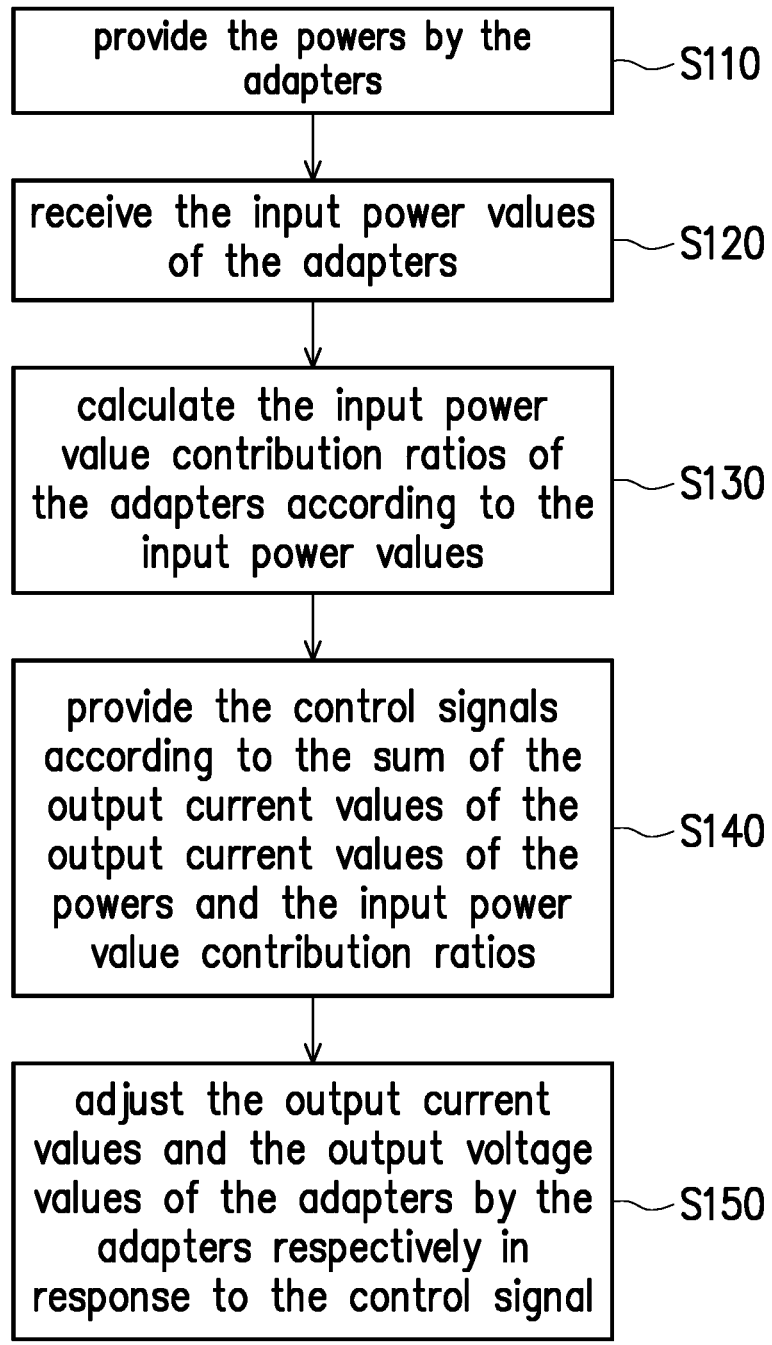
FIG. 2 is a flowchart of an operation method according to an embodiment of the disclosure.

Referring to both FIGS. 1 and 2, FIG. 1 is a schematic view of a multi-power management system according to the first embodiment of the disclosure. FIG. 2 is a flowchart of an operation method according to an embodiment of the disclosure. A multi-power management system 100 may be adapted for providing an output power PO to an electronic device (such as a notebook computer and a personal computer). In this embodiment, the multi-power management system 100 includes adapters 110_1 and 110_2, and a power supply circuit 120. In step S110, the adapters 110_1 and 110_2 provide powers P_1 and P_2. For example, the adapter 110_1 receives an input power PIN_1, and provides the power P_1. The adapter 110_2 receives an input power PIN_2, and provides the power P_2. The powers P_1 and P_2 may be regarded as converted powers. In this embodiment, the power supply circuit 120 is coupled to the adapters 110_1 and 110_2. The power supply circuit 120 may be disposed inside or outside the electronic device. The power supply circuit 120 receives the powers P_1 and P_2, and provides the output power PO. A power value of the output power PO is substantially equal to a sum of power values of the powers P_1 and P_2.

In this embodiment, the power supply circuit 120 communicates with the adapters 110_1 and 110_2. In step S120, the power supply circuit 120 receives input power values of the adapters 110_1 and 110_2. In step S130, the power supply circuit 120 calculates an input power value contribution ratio of the adapter 110_1 and an input power value contribution ratio of the adapter 110_2 according to the input power values of the adapters 110_1 and 110_2. In step S140, the power supply circuit 120 provides one of control signals SC1 and SC2 according to a sum of the output current values of multiple output current values of the powers P_1 and P_2, and the input power value contribution ratios of the adapters 110_1 and 110_2.

In this embodiment, in step S150, the adapter 110_1 adjusts an output current value and an output voltage value of the adapter 110_1 in response to one of the control signals SC1 and SC2. The adapter 110_2 adjusts an output current value and an output voltage value of the adapter 110_2 in response to one of the control signals SC1 and SC2.

Here, note that in the multi-power management system 100, the adapters 110_1 and 110_2 provide the powers P_1 and P_2. The power supply circuit 120 provides the output power PO. The power value of the output power PO is substantially equal to the sum of the power values of the powers P_1 and P_2. In this way, the multi-power management system 100 may provide greater power. In addition, the power supply circuit 120 calculates the input power value contribution ratios of the adapters 110_1 and 110_2, and provides the corresponding control signal according to the sum of the output current values and the input power value contribution ratios of the adapters 110_1 and 110_2. The adapter 110_1 and 110_2 adjust the output current values and the output voltage values respectively in response to one of the control signals SC1 and SC2. In this way, the multi-power management system 100 may achieve a power supply balance of the adapters 110_1 and 110_2.

For convenience of the description, the two adapters 110_1 and 110_2 are taken as an example in this embodiment. The number of the adapters in the disclosure may be multiple, and the disclosure is not limited to this embodiment.

Figure 3:
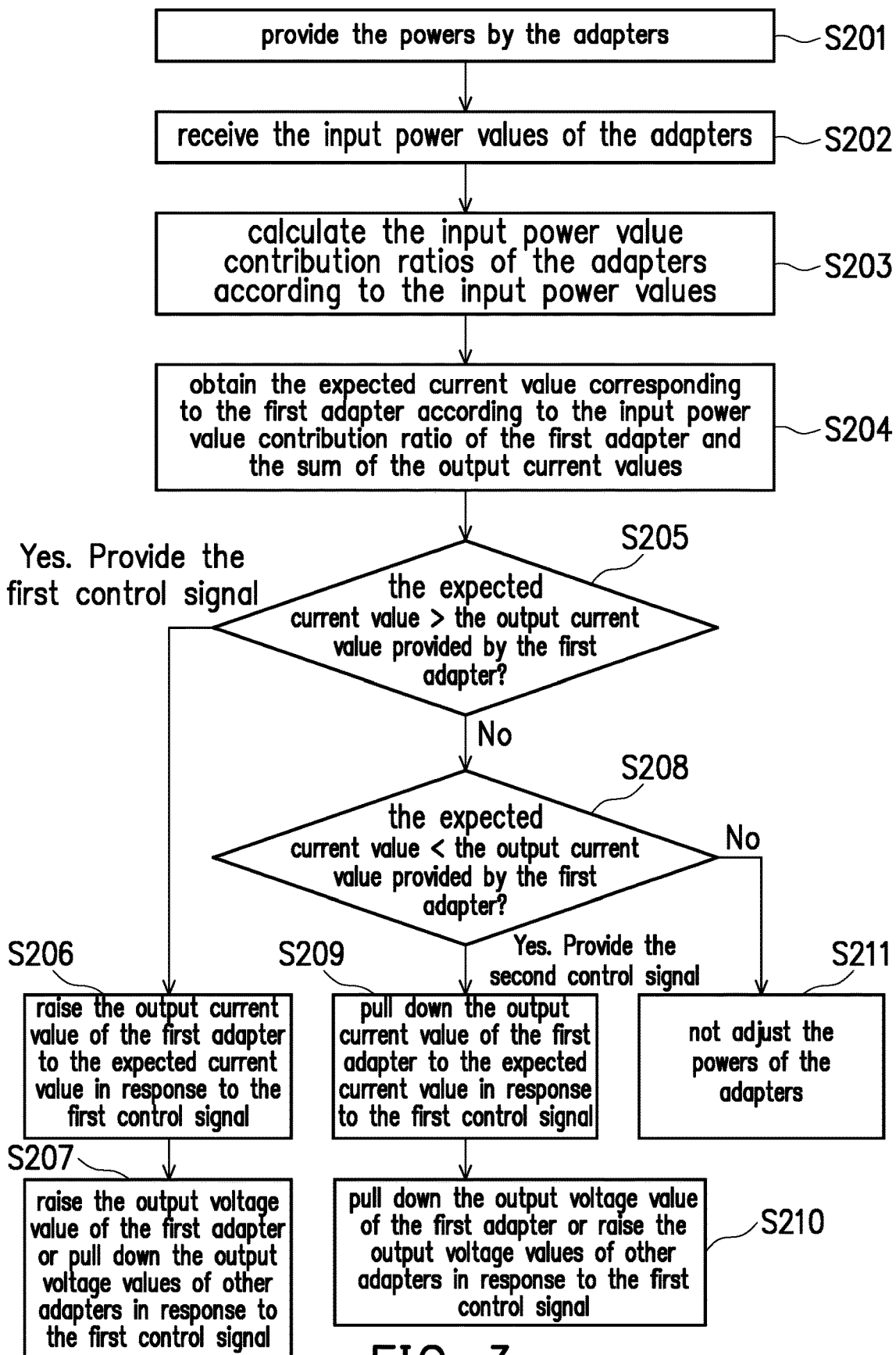
FIG. 3 is a flowchart of an operation method according to another embodiment of the disclosure.

For further example, referring to both FIGS. 1 and 3, FIG. 3 is a flowchart of an operation method according to another embodiment of the disclosure. In step S201, the adapters 110_1 and 110_2 provide the powers P_1 and P_2. In step S202, the power supply circuit 120 receives the input power values of the adapters 110_1 and 110_2. In step S203, the power supply circuit 120 calculates the input power value contribution ratio of the adapter 110_1 and the input power value contribution ratio of the adapter 110_2 according to the input power values of the adapters 110_1 and 110_2. For example, the input power value contribution ratio of the adapter 110_1 is the first quotient obtained by dividing an input power of the adapter 110_1 by a sum of the input power values of the adapters 110_1 and 110_2. The input power value contribution ratio of the adapter 110_2 is the second quotient obtained by dividing the input power value of the adapter 110_2 by a sum of input powers of the adapters 110_1 and 110_2.

In step S204, taking the control of the adapter 110_1 as an example, the power supply circuit 120 obtains an expected current value corresponding to the adapter 110_1 according to the input power value contribution ratio of the adapter 110_1 (i.e., a first adapter) and the sum of the output current values. In this embodiment, the sum of the output current values is the sum of the output current value of the adapter 110_1 and the output current value of the adapter 110_2. The expected current value of the adapter 110_1 is a product of the sum of the output current values and the input power value contribution ratio of the adapter 110_1. After calculating the expected current value of the adapter 110_1, in step S205, the power supply circuit 120 determines whether the expected current value of the adapter 110_1 is greater than the output current value provided by the adapter 110_1. When the expected current value of the adapter 110_1 is determined to be greater than the output current value provided by the adapter 110_1, the power supply circuit 120 provides the control signal SC1 (i.e., a first control signal). Next, in step S206, the adapter 110_1 raises the output current value to the expected current value of the adapter 110_1 in response to the control signal SC1. In step S207, the output voltage value of the adapter 110_1 is also raised in response to the control signal SC1. After step S207, the operation method returns to step S201.

In some embodiments, in step S207, the output voltage value of the adapter 110_2 is pulled down in response to the control signal SC1. In some embodiments, in response to the control signal SC1, the output voltage value of the adapter 110_1 is raised, and the output voltage value of the adapter 110_1 is pulled down.

Returning to step S205, when the expected current value of the adapter 110_1 is determined to be less than or equal to the output current value provided by the adapter 110_1, in step S208, the power supply circuit 120 determines whether the expected current value of the adapter 110_1 is less than the output current value provided by the adapter 110_1. When the expected current value of the adapter 110_1 is determined to be less than the output current value provided by the adapter 110_1, the power supply circuit 120 provides the control signal SC2 (i.e., a second control signal). Next, in step S209, the adapter 110_1 pulls down the output current value to the expected current value of the adapter 110_1 in response to the control signal SC2. In step S210, the output voltage value of the adapter 110_1 is also pulled down in response to the control signal SC2. After step S210, the operation method returns to step S201.

In some embodiments, in step S210, the output voltage value of the adapter 110_2 is raised in response to the control signal SC2. In some embodiments, in response to the control signal SC2, the output voltage value of the adapter 110_1 is pulled down, and the output voltage value of the adapter 110_1 is raised.

Returning to step S208, when the expected current value of the adapter 110_1 is determined to be no less than the output current value provided by the adapter 110_1, it means that the expected current value of the adapter 110_1 is substantially equal to the output current value provided by the adapter 110_1. In step S211, the power supply circuit 120 does not provide the control signals SC1 and SC2. Therefore, in step S211, the powers P_1 and P_2 of the adapters 110_1 and 110_2 are not adjusted. After step S211, the operation method returns to step S201.

Figure 4:
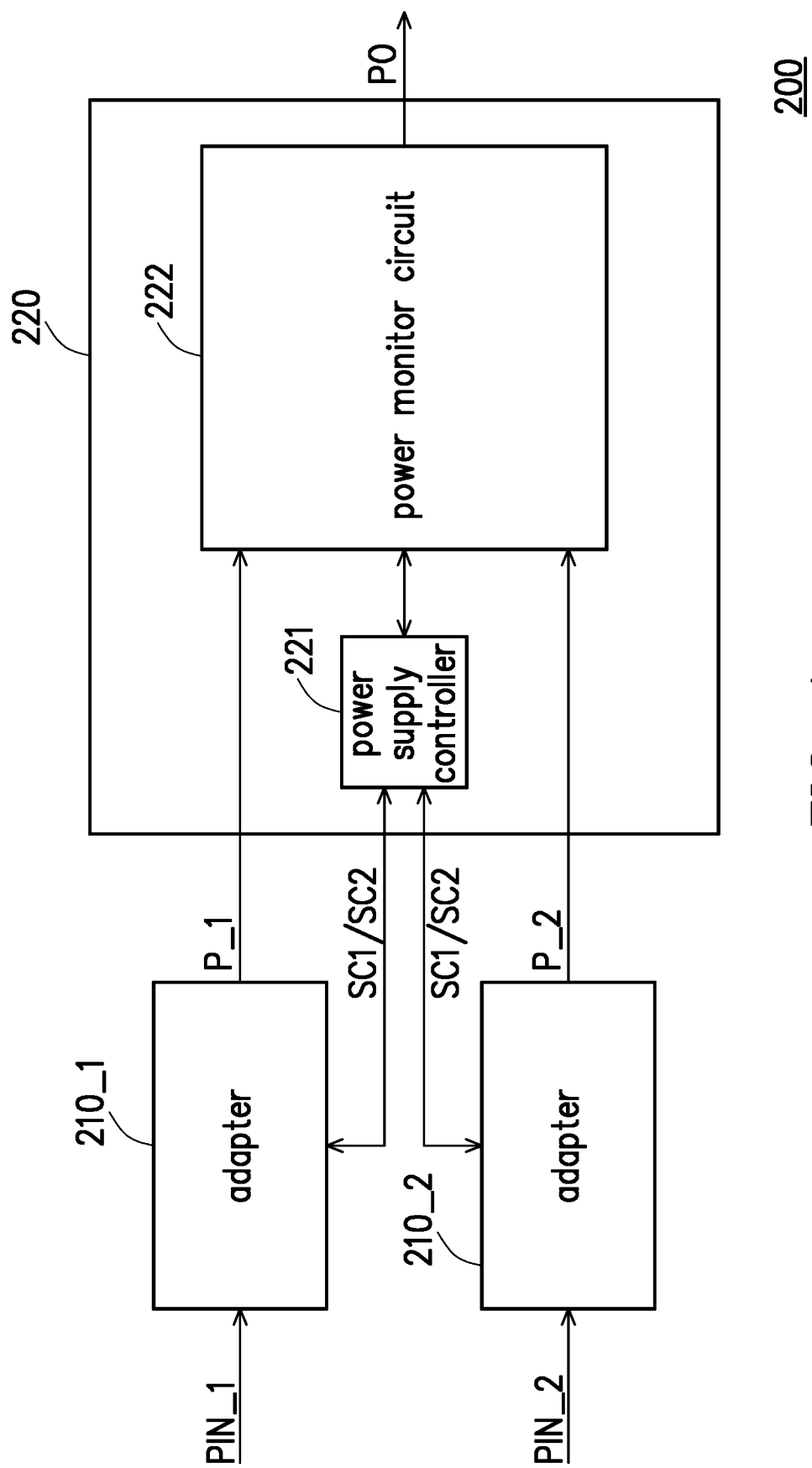
FIG. 4 is a schematic view of a multi-power management system according to the second embodiment of the disclosure.

Referring to FIG. 4, FIG. 4 is a schematic view of a multi-power management system according to the second embodiment of the disclosure. In this embodiment, a multi-power management system 200 includes adapters 210_1 and 210_2, and a power supply circuit 220. The power supply circuit 220 includes a power supply controller 221 and a power monitor circuit 222. In this embodiment, the power supply controller 221 communicates with the adapters 210_1 and 210_2 to receive input power values of the adapters 210_1 and 210_2. In this embodiment, the power supply controller 221 may communicate with the adapters 210_1 and 210_2 through a wired communication method or a wireless communication method that are well known to people of ordinary skills in the art. In this embodiment, the power supply controller 221 may further receive output current values of the adapters 210_1 and 210_2.

In this embodiment, the power monitor circuit 222 is coupled to the power supply controller 221. The power monitor circuit 222 provides the control signal (i.e., one of the control signals SC1 and SC2) according to a sum of the output current values and the input power value contribution ratios, and controls the power supply controller 221 to provide the control signal to the adapters 210_1 and 210_2. In this embodiment, the power monitor circuit 222 sums the input power value of the adapter 210_1 and the input power value of the adapter 210_2 to generate a sum of the input power values. The power monitor circuit 222 divides the input power value of the adapter 210_1 by the sum of the input power values to obtain a quotient as an input power value contribution ratio of the adapter 210_1. Similarly, the power monitor circuit 222 may also divide the input power value of the adapter 210_2 by the sum of the input power values to obtain a quotient as an input power value contribution ratio of the adapter 210_2. The power monitor circuit 222 sums the output current values of the adapters 210_1 and 210_2 to generate the sum of the output current values. Next, the power monitor circuit 222 generates the control signals SC1 and SC2 according to a product of the input power value contribution ratios and the sum of the output current values of the adapters 210_1 and 210_2. In this embodiment, the power monitor circuit 222 is, for example, a programmable general-purpose or special-purpose microprocessor, a digital signal processor (DSP), a programmable controller, an application specific integrated circuit (ASIC), a programmable logic device (PLD), other similar devices, or a combination of these devices, which may load and execute computer programs.

For example, in this embodiment, the power monitor circuit 222 acquires the input power value of the adapter 210_1 to be 100 watts and the input power value of the adapter 210_2 to be 60 watts through the power supply controller 221. The power monitor circuit 222 sums the input power values of the adapters 210_1 and 210_2 to generate the sum of the input power values (that is, 160 watts). Next, the power monitor circuit 222 acquires the input power value contribution ratio of the adapter 210_1 to be 0.625. The power monitor circuit 222 also acquires the input power value contribution ratio of the adapter 210_2 to be 0.375. In this example, the input power values of the adapters 210_1 and 210_2 correspond to a distribution ratio with the best efficiency. In this example, the power monitor circuit 222 acquires the output current value of the adapter 210_1 to be 2.2 amperes and the output current value of the adapter 210_2 to be 2.8 amperes through the power supply controller 221. Therefore, the power monitor circuit 222 obtains the sum of the output current values of the adapter 210_1 (that is, 5 amperes). Next, the power monitor circuit 222 acquires an expected current value of the adapter 210_1 to be equal to 3.125 amperes, and acquires an expected current value of the adapter 210_2 to be equal to 1.875 amperes.

In addition, in this example, in terms of the specifications, the adapters 210_1 and 210_2 have, for example, voltage curves. An output voltage curve of the adapter 210_1 is a no-load voltage value of 20.5 volts and a full-load voltage value of 19.5 volts. An output voltage curve of the adapter 210_2 is a no-load output voltage value of 20.5 volts and a full-load output voltage value of 20 volts. After the adapters 210_1 and 210_2 are coupled to each other, voltages intersect at 19.8 volts. In other words, output voltages of the adapters 210_1 and 210_2 are respectively 19.8 volts. Therefore, a sum of output power values of the adapters 210_1 and 210_2 is equal to 99 watts. That is, the power value of the output power PO is substantially 99 watts. It should be noted that the output power value of the adapter 210_1 occupies 0.44 of the sum of the output power values. Such a result obviously has a significant gap with the input power value contribution ratio (i.e., 0.625) of the adapter 210_1. In addition, the output power value of the adapter 210_2 occupies 0.56 of the sum of the output power values. Such a result obviously has a significant gap with the input power value contribution ratio (i.e., 0.375) of the adapter 210_2. In other words, the adapters 210_1 and 210_2 have not achieved the power supply balance yet.

The power monitor circuit 222 determines that the expected current value (3.125 amperes) of the adapter 210_1 is greater than the output current value (2.2 amperes) of the adapter 210_1. Therefore, the power monitor circuit 222 provides the control signal SC1 to the adapter 210_1. The adapter 210_1 raises the output current value of the adapter 210_1 to the expected current value of the adapter 210_1 in response to the control signal SC1. In addition, the adapter 210_1 also raises an output voltage value of the adapter 210_1 in response to the control signal SC1, so that the voltages after the adapter 210_1 is coupled to the adapter 210_2 intersect at 20.25 volts. In other words, the output voltages of the adapters 210_1 and 210_2 are respectively 20.25 volts. Therefore, the sum of the output power values of the adapters 210_1 and 210_2 is equal to 99 watts. That is, the power value of the output power PO is substantially 99 watts.

In addition, another adjustment method may reduce the output voltage to achieve the same power supply balance. The power monitor circuit 222 determines that the expected current value (1.875 amperes) of the adapter 210_2 is less than the output current value (2.8 amperes) of the adapter 210_2. Therefore, the power monitor circuit 222 provides the control signal SC2 to the adapter 210_2. The adapter 210_2 pulls down the output current value of the adapter 210_2 to the expected current value of the adapter 210_2 in response to the control signal SC2. In addition, the adapter 210_2 also pulls down the output voltage of the adapter 210_2 in response to the control signal SC2, so that a voltage intersection value after the adapter 210_1 is coupled to the adapter 210_2 is pulled down from 19.8 volts to 19.75 volts. Therefore, the sum of the output power values of the adapters 210_1 and 210_2 is equal to 99 watts. That is, the power value of the output power PO is substantially 99 watts.

It should be noted that, in this example, after the output current value and the output voltage value of the adapter 210_1 are adjusted, the output power value of the adapter 210_1 is 61.875 watts. After the output current value and the output voltage value of the adapter 210_2 are adjusted, the output power value of the adapter 210_2 is 37.125 watts. The output power value of the adapter 210_1 occupies 0.625 of the sum of the output power values. Such a result is obviously close to the input power value contribution ratio (i.e., 0.625) of the adapter 210_1. In addition, the output power value of the adapter 210_2 occupies 0.375 of the sum of the output power values. Such a result is obviously close to the input power value contribution ratio (i.e., 0.375) of the adapter 210_2. In other words, the adapters 210_1 and 210_2 achieve the power supply balance. It should also be noted that, as mentioned earlier, the input power values of the adapters 210_1 and 210_2 correspond to the distribution ratio with the best efficiency. The input power value contribution ratios of the adapters 210_1 and 210_2 correspond to the distribution ratio with the best efficiency. In other words, after adjustment, output powers of the adapters 210_1 and 210_2 corresponds to the distribution ratio with the best efficiency. Therefore, after adjustment, the multi-power management system 200 may provide an output power with the best efficiency.

Hereinafter, implementation details of obtaining an input power value with the best efficiency are described with examples. Referring to Table 1, Table 2, and FIG. 4 together. Table 1 is a comparison table of the load and the efficiencies of the adapters 210_1 and 210_2. Table 2 is a comparison table of the input power values of the adapters 210_1 and 210_2 based on a fixed load requirement.

TABLE 1

| load percentage | the efficiency of the adapter 210_1 | the efficiency of the adapter 210_2 |
|---|---|---|
| 20% | 91% | 89% |
| 40% | 93% | 92% |
| 60% | 95% | 96% |
| 80% | 94% | 95% |
| 100% | 94% | 95% |

TABLE 2

| adapter 210_1 | | adapter 210_2 | | the sum of the |
|---|---|---|---|---|
| load percentage | input power value | load percentage | input power value | input power values |
| 20% | 32.97 watts | 100% | 157.89 watts | 190.86 watts |
| 40% | 64.52 Watt | 80% | 126.32 watts | 190.83 watts |
| 60% | 94.74 watts | 60% | 93.75 watts | 188.49 watts |
| 80% | 127.66 watts | 40% | 65.22 watts | 192.88 watts |
| 100% | 159.57 watts | 20% | 33.71 Watt | 193.28 watts |

In this embodiment, the input power values of the powers P_1 and P_2 provided by the adapters 210_1 and 210_2 are both 150 watts. Based on the specifications of the adapters 210_1 and 210_2, the adapters 210_1 and 210_2 have different efficiencies under different loads. In this embodiment, when the load of the adapter 210_1 is 20% (that is, the output power is 30 watts), the efficiency of the adapter 210_1 is 91% (that is, the input power value is about 32.96 watts). When the load of the adapter 210_1 is 40% (that is, the output power is 60 watts), the efficiency of the adapter 210_1 is 93% (that is, the input power value is about 64.52 watts), and the rest may be derived by analog. Similarly, when the load of the adapter 210_2 is 20% (that is, the output power is 30 watts), the efficiency of the adapter 210_2 is 89% (that is, the input power value is about 33.71 watts). When the load of the adapter 210_2 is 40% (that is, the output power is 60 watts), the efficiency of the adapter 210_2 is 92% (that is, the input power value is about 65.22 watts), and the rest may be derived by analog.

In Table 2, the input power value may be obtained by Formula (1).

$$PIN = (POUT \times PLD)/EFF \qquad \text{Formula (1)}$$

PIN refers to the input power values of the adapters 210_1 and 210_2. POUT refers to the output power values of the adapters 210_1 and 210_2. PLD refers to the load percentages of the adapters 210_1 and 210_2. In addition, EFF refers to the efficiencies of the adapters 210_1 and 210_2. For example, when the load of the adapter 210_1 is 20%, the input power value of the adapter 210_1 is about 32.97 watts (i.e., PIN=(150×20%)/91%).

In this embodiment, when the load requirement is 180 watts, Table 2 is established based on the fixed load requirement (i.e., 180 watts). A total of 5 combinations are listed in Table 2. In Table 2, the first row shows the first combination where the load of the adapter 210_1 is 20%, and the load of the adapter 210_2 is 100%. The second row shows the second combination where the load of the adapter 210_1 is 40%, and the load of the adapter 210_2 is 80%. The rest may be derived by analog. In Table 2, it may be found that the sum of the input power values in the first combination is the lowest. In other words, in the third combination, only the sum of the input power values of 188.49 watts is required to achieve the load requirement of 180 watts. Therefore, based on the load requirement of 180 watts, the combination where the input power value of the adapter 210_1 is 94.74 watts and the input power value of the adapter 210_2 is 93.75 watts has the best efficiency (i.e., 95%).

Figure 5:
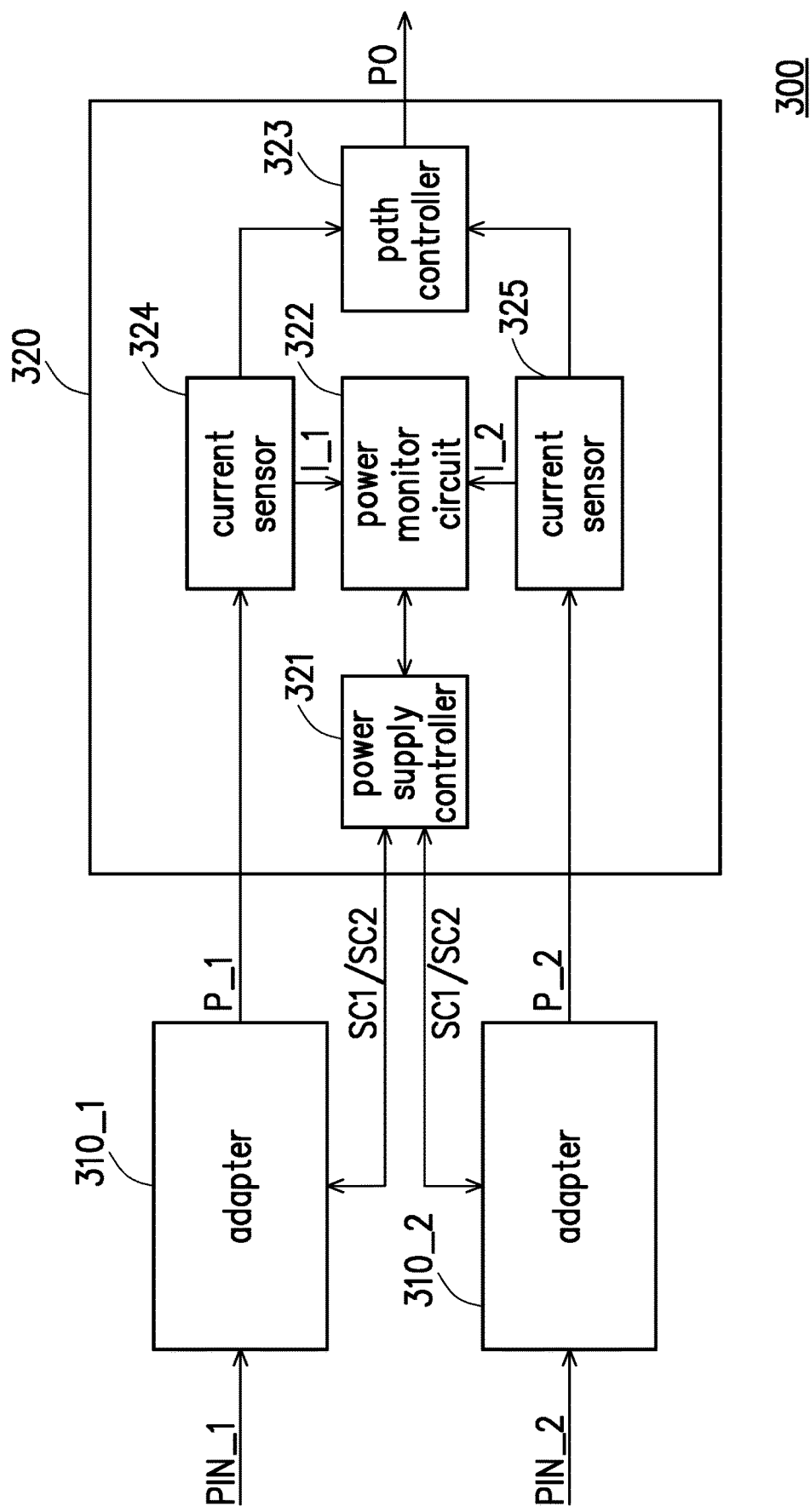
FIG. 5 is a schematic view of a multi-power management system according to the third embodiment of the disclosure.

Referring to FIG. 5, FIG. 5 is a schematic view of a multi-power management system according to the third embodiment of the disclosure. In this embodiment, a multi-power management system 300 includes adapters 310_1 and 310_2, and a power supply circuit 320. The power supply circuit 320 includes a power supply controller 321, a power monitor circuit 322, a path controller 323, and current sensors 324 and 325. In this embodiment, the power supply controller 321 communicates with the adapters 310_1 and 310_2 to receive input power values of the adapters 310_1 and 310_2. In this embodiment, sufficient teachings concerning a collaborative operation between the adapters 310_1 and 310_2, the power supply controller 321, and the power monitor circuit 322 may be gained in the embodiment of FIG. 4. Thus, details in this regard will not be further reiterated in the following.

In this embodiment, the current sensors 324 and 325 are coupled to the power monitor circuit 322. The current sensors 324 and 325 respectively correspond to the adapters 310_1 and 310_2, and respectively sense output current values I_1 and I_2 provided by the corresponding adapters 310_1 and 310_2. For example, the current sensor 324 corresponds to the adapter 310_1. The current sensor 324 senses the output current value I_1 provided by the adapter 310_1. In other words, the current sensor 324 senses the output current value I_1 of the power P_1. The current sensor 324 further provides the output current value I_1 to the power monitor circuit 322. The current sensor 325 corresponds to the adapter 310_2. The current sensor 325 senses the output current value I_2 provided by the adapter 310_2. In other words, the current sensor 325 senses the output current value I_2 of the power P_2. The current sensor 325 further provides the output current value I_2 to the power monitor circuit 322. In this embodiment, the current sensors 324 and 325 are disposed outside the power monitor circuit 322. In some embodiments, the current sensors 324 and 325 may be disposed inside the power monitor circuit 322.

In this embodiment, the path controller 323 is coupled to the current sensors 324 and 325. The path controller 323 receives the powers P_1 and P_2 through the current sensors 324 and 325. The path controller 323 provides the output power PO according to the powers P_1 and P_2. In addition, the path controller 323 further prevents the power P_1 from flowing to the current sensor 325 or the adapter 310_2, and prevents the power P_2 from flowing to the current sensor 324 or the adapter 310_1. In this embodiment, the path controller 323 is disposed outside the power monitor circuit 322. In some embodiments, the path controller 323 may be disposed inside the power monitor circuit 322.

Figure 6:
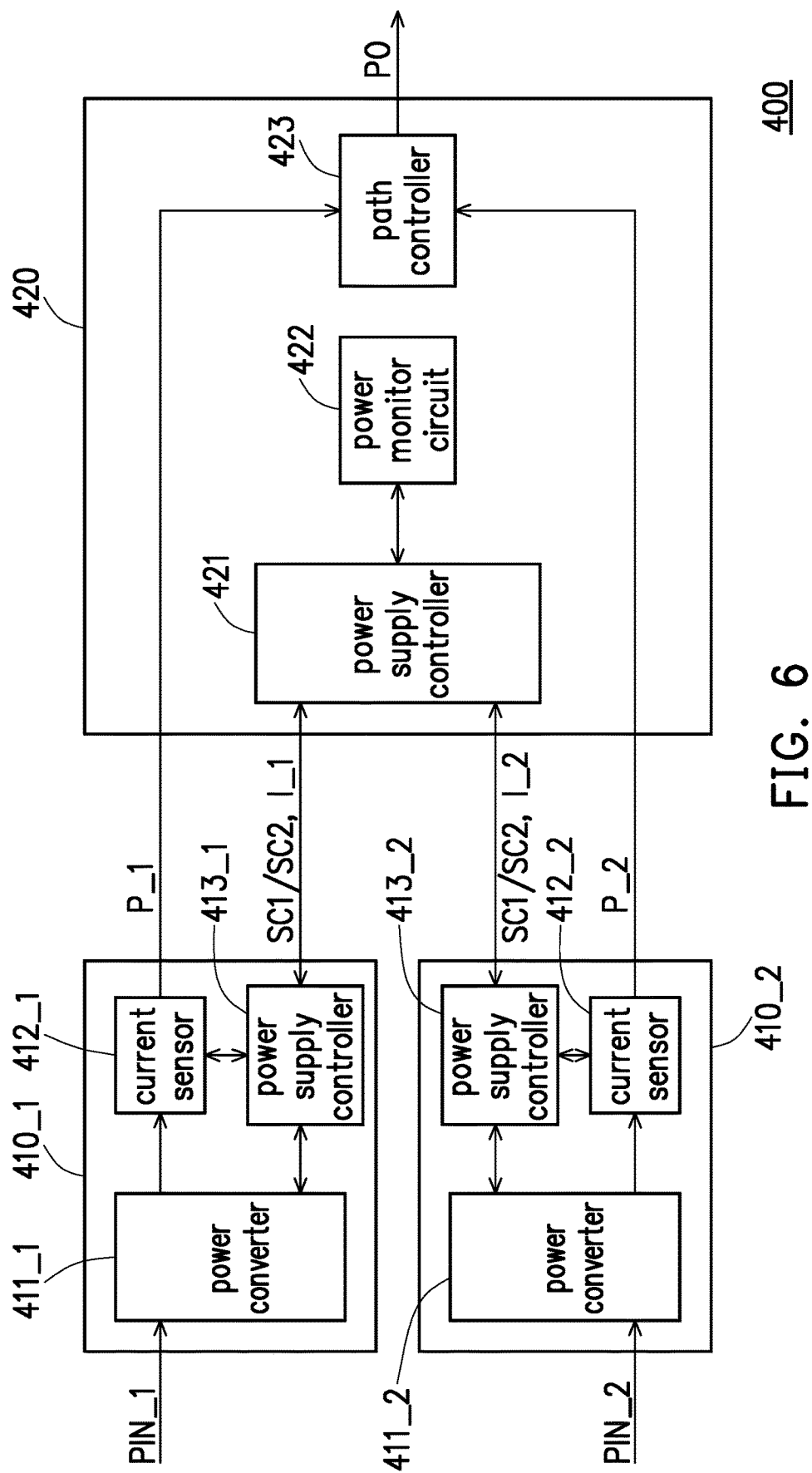
FIG. 6 is a schematic view of a multi-power management system according to the fourth embodiment of the disclosure.

Referring to FIG. 6, FIG. 6 is a schematic view of a multi-power management system according to the fourth embodiment of the disclosure. In this embodiment, a multi-power management system 400 includes adapters 410_1 and 410_2, and a power supply circuit 420. The power supply circuit 420 includes a power supply controller 421, a power monitor circuit 422, and a path controller 423. In this embodiment, sufficient teachings concerning a collaborative operation between the adapters 410_1 and 410_2, the power supply controller 421, and the power monitor circuit 422 may be gained in the embodiments of FIGS. 4 and 5. Thus, details in this regard will not be further reiterated in the following.

In this embodiment, the path controller 423 is coupled to the adapters 410_1 and 410_2. The path controller 423 provides the output power PO according to the powers P_1 and P_2. In addition, the path controller 423 further prevents the power P_1 from flowing to the adapter 310_2, and prevents the power P_2 from flowing to the adapter 410_1.

In this embodiment, the adapter 410_1 includes a power converter 411_1, a current sensor 412_1, and a power supply controller 413_1. The power supply controller 413_1 communicates with the power supply controller 421 of the power supply circuit 420, and receives one of the control signals SC1 and SC2. The power converter 411_1 is coupled to the power supply controller 413_1. The power converter 411_1 adjusts an output current value I_1 and an output voltage value of the adapter 410_1 in response to one of the control signals SC1 and SC2. The current sensor 412_1 is coupled to the power monitor circuit 422 and the power supply controller 413_1. The current sensor 412_1 senses the output current value I_1 of the adapter 410_1.

In this embodiment, the adapter 410_1 may further transmit the output current value I_1 and an input power value of the adapter 410_1 to the power supply controller 421 through the power supply controller 413_1. Therefore, the power monitor circuit 422 may acquire the output current value I_1 and the input power value of the adapter 410_1.

In this embodiment, the adapter 410_2 includes a power converter 411_2, a current sensor 412_2, and a power supply controller 413_2. Sufficient teachings concerning implementation details of the power converter 411_2, the current sensor 412_2, and the power supply controller 413_2 may be gained from the description of the adapter 410_1. Thus, details in this regard will not be further reiterated in the following.

In this embodiment, the power supply controller 421 of the power supply circuit 420 may wiredly or wirelessly communicate with the power supply controller 413_1 of the adapter 410_1 and the power supply controller 413_2 of the adapter 410_2.

In some embodiments, the power supply circuit 420 may disable or enable the adapter 410_1 through a communication between the power supply controllers 421 and 413_1. Similarly, the power supply circuit 420 may disable or enable the adapter 410_2 through a communication between the power supply controllers 421 and 413_2.

Based on the above, the multi-power management system according to the disclosure includes the adapters and the power supply circuit. The adapters provide the powers. The power supply circuit provides the output power. The power value of the output power is substantially equal to the sum of the power values of the powers. In this way, the multi-power management system may provide greater power. In addition, the power supply circuit calculates the input power value contribution ratios of the adapters according to the input power values of the adapters, and provides the corresponding control signal according to the sum of the output current values and the input power value contribution ratios. The adapters adjust the output current values and the output voltage values of the adapters respectively in response to the control signal. In this way, the multi-power management system may further achieve the power supply balance between the adapters.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A multi-power management system, comprising:
   a plurality of adapters, respectively configured to provide a plurality of powers; and
   a power supply circuit, coupled to the plurality of adapters, configured to communicate with the plurality of adapters to receive a plurality of input power values of the plurality of adapters, calculating a plurality of input power value contribution ratios of the plurality of adapters according to a plurality of load percentages and a plurality of efficiency in a situation of a lowest sum of the plurality of input power values of the plurality of adapters, and providing a corresponding control signal according to a sum of a plurality of output current values of the plurality of powers and the plurality of input power value contribution ratios,
   wherein the plurality of adapters adjust the plurality of output current values and a plurality of output voltage values of the plurality of adapters respectively in response to the control signal.

2. The multi-power management system according to claim 1, wherein:
   the plurality of adapters comprise at least a first adapter and a second adapter,
   the power supply circuit obtains a first input power value contribution ratio corresponding to the first adapter among the plurality of input power value contribution ratios,
   the power supply circuit obtains an expected current value of the first adapter according to the first input power value contribution ratio and the sum of the output current values,
   when the expected current value is greater than an output current value provided by the first adapter, the power supply circuit provides a control signal, and
   the first adapter raises the output current value to the expected current value in response to the control signal.

3. The multi-power management system according to claim 2, wherein the first adapter raises an output voltage value provided by the first adapter in response to the control signal.

4. The multi-power management system according to claim 2, wherein the second adapter pulls down an output voltage value provided by the second adapter in response to the control signal.

5. The multi-power management system according to claim 1, wherein the power supply circuit comprises:

a first power supply controller, configured to communicate with the plurality of adapters to receive the plurality of input power values; and a power monitor circuit, coupled to the first power supply controller, configured to provide the control signal according to the sum of the output current values and the plurality of input power value contribution ratios, and controlling the first power supply controller to provide the control signal to the plurality of adapters.

6. The multi-power management system according to claim 5, wherein the power monitor circuit is further configured to:

sum the plurality of output current values to generate the sum of the output current values, and generate the control signal according to a product of the plurality of input power value contribution ratios and the sum of the output current values.

7. The multi-power management system according to claim 6, wherein the power monitor circuit is further configured to:

sum the plurality of input power values to generate a sum of the input power values, and divide a first input power value of a first adapter among the plurality of adapters by the sum of the input power values to obtain a quotient as a first input power value contribution ratio of the first adapter.

8. The multi-power management system according to claim 5, wherein the power supply circuit further comprises:

a plurality of current sensors, coupled to the power monitor circuit, respectively configured to correspond to the plurality of adapters, and respectively sensing an output current value provided by an adapter.

9. The multi-power management system according to claim 5, wherein a first adapter among the plurality of adapters comprises:

a second power supply controller, configured to communicate with the first power supply controller to receive the control signal and transmit an input power value of the first adapter and an output current value of the first adapter.

10. The multi-power management system according to claim 9, wherein the first adapter further comprises:

a power converter, coupled to the second power supply controller, and configured to adjust the output current value of the first adapter and an output voltage value of the first adapter in response to the control signal.

11. The multi-power management system according to claim 10, wherein the first adapter further comprises:

a current sensor, coupled to the power monitor circuit and the second power supply controller, and configured to sense the output current value of the first adapter, wherein the first adapter provides the output current value and the input power value of the first adapter to the first power supply controller through the second power supply controller.

12. The multi-power management system according to claim 5, wherein the power supply circuit comprises:

a path controller, coupled to the plurality of adapters, and configured to prevent a power of each of the plurality of adapters from flowing to other adapters.

13. The multi-power management system according to claim 1, wherein the power monitor circuit is further configured to:

determine the plurality of input power values with a best efficiency according to a plurality of specifications and load requirements of the plurality of adapters, wherein the plurality of input power value contribution ratios correspond to a distribution ratio with the best efficiency.

14. An operation method for a multi-power management system, wherein the multi-power management system comprises a plurality of adapters and a power supply circuit, wherein the operation method comprises:

providing a plurality of powers by the plurality of adapters;

receiving a plurality of input power values of the plurality of adapters by a communication between the power supply circuit and the plurality of adapters;

calculating a plurality of input power value contribution ratios of the plurality of adapters by the power supply circuit according to a plurality of load percentages and a plurality of efficiency in a situation of a lowest sum of the plurality of input power values of the plurality of adapters;

providing a corresponding control signal by the power supply circuit according to a sum of a plurality of output current values of the plurality of powers and the plurality of input power value contribution ratios; and adjusting the plurality of output current values and a plurality of output voltage values of the plurality of adapters by the plurality of adapters respectively in response to the control signal.

15. The operation method according to claim 14, wherein:

the plurality of adapters comprise at least a first adapter and a second adapter, providing the corresponding control signal according to the sum of the output current values of the plurality of output current values of the plurality of powers and the plurality of input power value contribution ratios comprises:

obtaining an expected current value of the first adapter according to a first input power value contribution ratio corresponding to the first adapter among the plurality of input power value contribution ratios and the sum of the output current values; and when the expected current value is greater than an output current value provided by the first adapter, the power supply circuit provides a control signal.

16. The operation method according to claim 14, wherein adjusting the plurality of output current values and the plurality of output voltage values of the plurality of adapters in response to the control signal comprises:

raising the output current value to the expected current value by the first adapter in response to the control signal.

17. The operation method according to claim 16, wherein adjusting the plurality of output current values and the plurality of output voltage values of the plurality of adapters in response to the control signal further comprises:

raising an output voltage value provided by the first adapter by the first adapter in response to the control signal.

18. The operation method according to claim 16, wherein adjusting the plurality of output current values and the plurality of output voltage values of the plurality of adapters in response to the control signal further comprises:

pulling down an output voltage value provided by the second adapter by the second adapter in response to the control signal.

19. The operation method according to claim 14, wherein providing the corresponding control signal according to the sum of the output current values of the plurality of output current values of the plurality of powers and the plurality of input power value contribution ratios comprises:
    summing the plurality of output current values to generate the sum of the output current values; and
    generating the control signal according to a product of the plurality of input power value contribution ratios and the sum of the output current values.

20. The operation method according to claim 19, wherein calculating the plurality of input power value contribution ratios of the plurality of load percentages and the plurality of efficiency in the situation of the lowest sum of the plurality of input power values of the plurality of adapters comprises:
    summing the plurality of input power values to generate a sum of the input power values, and
    dividing a first input power value of a first adapter among the plurality of adapters by the sum of the input power values to obtain a quotient as a first input power value contribution ratio of the first adapter.

21. The operating method according to claim 14, further comprising:
    determining the plurality of input power values with a best efficiency by the power supply circuit according to a plurality of specifications and load requirements of the plurality of adapters,
    wherein the plurality of input power value contribution ratios correspond to a distribution ratio with the best efficiency.

\* \* \* \* \*